United States Patent [19]

Chen et al.

[11] Patent Number: 5,529,847
[45] Date of Patent: Jun. 25, 1996

[54] CURED EPOXY POLYSILOXANE COATED ARTICLES USEFUL IN TONER FUSING MEMBERS

[75] Inventors: Jiann H. Chen, Fairport; Tsang J. Chen; Lawrence P. DeMejo, both of Rochester, all of N.Y.

[73] Assignee: Eastman Kodak Company, Rochester, N.Y.

[21] Appl. No.: 212,340

[22] Filed: Mar. 14, 1994

Related U.S. Application Data

[63] Continuation-in-part of Ser. No. 896,765, Jun. 10, 1992, abandoned.

[51] Int. Cl.$^6$ ............................. B32B 27/00; B32B 27/38
[52] U.S. Cl. ............................. 428/413; 428/447; 430/98; 525/476; 525/477
[58] Field of Search .................... 525/476, 477, 525/413, 447; 430/98; 428/413, 447

[56] References Cited

U.S. PATENT DOCUMENTS

| | | | |
|---|---|---|---|
| 3,792,012 | 2/1974 | Zdaniewski | 525/477 |
| 4,130,599 | 12/1978 | Merrill et al. | 525/477 |
| 4,283,513 | 8/1981 | Mikami | 525/476 |
| 4,313,988 | 2/1982 | Koshar et al. | 428/40 |
| 4,749,743 | 6/1988 | Ambrose et al. | 525/123 |
| 4,816,496 | 3/1989 | Wada et al. | 522/17 |
| 4,859,722 | 8/1989 | Shiobara et al. | 523/433 |
| 4,880,882 | 11/1989 | Morita et al. | 525/446 |
| 4,954,364 | 4/1990 | Stein et al. | 427/54.1 |
| 4,966,922 | 10/1990 | Gross et al. | 522/25 |
| 4,987,203 | 1/1991 | Saho et al. | 528/27 |

OTHER PUBLICATIONS

"Information About Silicone Resins", Dow Corning Corporation, 1985.

*Primary Examiner*—Ralph H. Dean
*Attorney, Agent, or Firm*—Anne B. Kiernan

[57] ABSTRACT

Toner fusing members coated with cured epoxy-substituted organopolysiloxane compositions are obtained. Such epoxy-substituted organopolysiloxanes are obtained by hydride-addition of a hydride-substituted organopolysiloxane with an unsaturated epoxy compound.

19 Claims, No Drawings

CURED EPOXY POLYSILOXANE COATED ARTICLES USEFUL IN TONER FUSING MEMBERS

This is a continuation-in-part of U.S. Ser. No. 07/896,765 filed Jun. 10, 1992, titled "Cured Epoxy Polysiloxane Coated Articles Useful in Toner Fusing Members", now abandoned.

FIELD OF INVENTION

This invention relates to toner fusing members and, more particularly, to such members coated with a heat-cured epoxy-substituted organopolysiloxane composition.

BACKGROUND OF THE INVENTION

In certain electrostatographic imaging and recording processes, for instance, in electrophotographic copying processes, an electrostatic latent image formed on a photoconductive surface is developed with a developer which is a mixture of carrier particles, e.g., magnetic particles, and a thermoplastic toner powder which is thereafter fused to a receiver such as a sheet of paper. The fusing member can be a roll, belt or any surface having a suitable shape for fixing thermoplastic toner powder images to a substrate. The fusing step commonly consists of passing the substrate, such as a sheet of paper on which toner powder is distributed in an imagewise pattern, through the nip of a pair of rolls, at least one of which is heated. Where the fusing member is a belt it is preferably a flexible endless belt having a smooth, hardened outer surface which passes around a heated roller. A persistent problem in this operation is that when the toner is heated during contact with the heated roll or belt it may adhere not only to the paper but also to the fusing member. Any toner remaining adhered to the member can cause a false offset image to appear on the next sheet and can also degrade the fusing member. Another potential problem is thermal degradation of the member surface which results in an uneven surface and defective patterns in thermally fixed images.

Toner fusing rolls have a cylindrical core which may contain a heat source in its interior, and a resilient covering layer formed directly or indirectly on the surface of the core. Roll coverings are commonly fluorocarbon polymers or silicone polymers, such as poly(dimethylsiloxane) polymers, of low surface energy which minimizes adherence of toner to the roll. Frequently release oils composed of, for example, poly(dimethylsiloxanes), are also applied to the roll surface to prevent adherence of toner to the roll. Such release oils may interact with the roll surface upon repeated use and in time cause swelling, softening and degradation of the roll. Silicone rubber covering layers which are insufficiently resistant to release oils and cleaning solvents are also susceptible to delamination of the roll cover after repeated heating and cooling cycles.

Toner fusing belts are composed of a continuous flexible material having superior resistance to heat and a smooth surface. The belt substrate can be metallic or polymeric. The surface of the belt is composed of a thinly coated, low surface energy polymer such as a fluorocarbon or a silicone resin.

Techniques for coating fusing members, such as ring coating and dip coating, require compositions that form stable coats on drying. Coatings which tend to flow or sag can form an uneven surface on curing, with adverse results on image transfer.

There is a need for coating compositions which do not flow or sag on drying and which adhere strongly to both rolls and belts. The surface should be hard and tough, and resistant to wear, cracking, cleaning solvents and releasing fluids.

SUMMARY OF THE INVENTION

The present invention relates to coated toner fusing members with increased resistance to solvents, image offset, abrasion, oil swelling and delamination.

The coated article of the invention, such as a fusing belt, comprises a substrate and coated thereon a composition comprising a crosslinked product of an epoxy-substituted organopolysiloxane and a curing agent for epoxides. These epoxy-substituted organopolysiloxanes are of the formula,

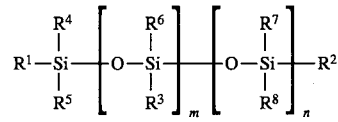

wherein,
$R^1$, $R^2$ and $R^3$ are independently $C_{1-6}$ alkyl, phenyl or a monovalent epoxy-containing hydrocarbon group of the formula,

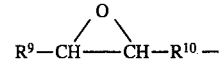

provided that said epoxy-substituted organopolysiloxane has at least two monovalent epoxy-containing hydrocarbon groups;
$R^4$–$R^8$ are independently $C_{1-6}$ alkyl or phenyl;
$R^9$ is H or $C_{1-6}$ alkyl;
$R^{10}$ is $C_{2-8}$ alkylene, optionally interrupted by —O— or

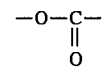

groups;
m is 0 to 1,000; and
n is 5 to 10,000.

In addition the composition may contain a hydroxyl functionalized hard silicone resin.

DETAILED DESCRIPTION OF THE INVENTION

The coated articles of the invention are obtained by coating a substrate with a mixture comprising an epoxy-substituted organopolysiloxane and a curing agent, with or without the addition of a hydroxyl functionalized hard silicone resin, and inducing crosslinking between the epoxy groups and the active functional groups of the curing agent. The hard silicone resin self-cures on heating, however, the hydroxyl groups can also crosslink with the active groups of the curing agent.

The epoxy-substituted organopolysiloxane component of the coating composition is obtained by hydride addition of a hydride-substituted organopolysiloxane to an unsaturated epoxy-substituted hydrocarbon. The hydride-substituted organopolysiloxane can be hydride terminated or contain internal hydride groups.

Preferred hydride-substituted organopolysiloxanes are of the formula,

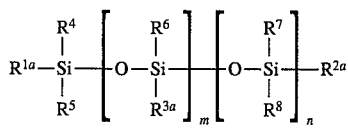

wherein, $R^{1a}$, $R^{2a}$ and $R^{3a}$ are hydrogen, $C_{1-6}$ alkyl or phenyl, provided that said organopolysiloxane has at least two hydrogen groups;

$R^4$–$R^8$ are independently $C_{1-6}$ alkyl or phenyl;

m is 0 to 1,000; and n is 5 to 10,000.

The hydride substituted organopolysiloxane polymers can be prepared by the copolymerization of the appropriate monomers using known polymerization catalysts as described, for example in Gilbert and Kantor, "Transient Catalysts for the Polymerization of organosiloxanes", Journal of Polymer Science, Vol XL, pp. 35–58, 1959, which is hereby incorporated by reference.

Suitable monomers for the hydride-substituted organopolysiloxane polymers include any monomer which yields the desired substituted organosiloxane repeating units. These polymers should contain at least two hydride groups which are available for addition to the unsaturated functions of the other elastomer reactants. Particularly suitable monomers yield dimethylsiloxane or diphenylsiloxane repeating unit and include both linear and cyclic monomers containing dimethylsiloxane or diphenylsiloxane groups. A preferred monomer for providing the dimethylsiloxane units is octamethylcyclotetrasiloxane. A preferred monomer for providing the diphenylsiloxane units is octaphenylcylotetrasiloxane. Suitable monomers for providing the hydride units include dimethylsilyl chloride, pentamethyldisiloxane, heptamethyltrisiloxane, 1,1,1,2,3,4,4,4-octamethyltetrasiloxane, hexamethylcylotetrasiloxane and mixtures of methylhydrocyclosiloxanes. Other monomer organosiloxane units (e.g., diethylsiloxane and other endcapping moieties such as those formed from hexamethyldisiloxane, decamethyltetrasiloxane, 1,3-diphenyltetramethyl-disiloxane, and 1,1,5,5-tetraphenyl-1,3,3,5-tetramethyltrisiloxane) may be added in appropriate amounts.

Unsaturated epoxy-substituted hydrocarbons which are of use in carrying out the invention have the formula,

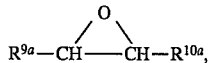

wherein, $R^{9a}$ is H or $C_{1-6}$ alkyl; and $R^{10a}$ is $C_{2-8}$ alkenyl optionally interrupted by —O— or

groups.

Exemplary unsaturated epoxides include allyl glycidyl ether, glycidyl acrylate, glycidyl methacrylate, 1,2-epoxy-7-octene, 3,4-epoxy-1-butene, 1,2-epoxy- 5-hexene and the like. These epoxides are either commercially available or readily prepared by methods well known in the prior art.

To prepare the epoxy-substituted polysiloxanes the hydride-substituted organopolysiloxane and the alkenyl-substituted epoxide are mixed with a suitable inert solvent, for example, toluene, tetrahydrofuran or dimethylformamide. Where the reactants are liquid, a solvent is not necessary. Hydride addition is promoted by a suitable catalyst. Suitable catalysts are, for example, Group VIII metals or derivatives thereof. Examples of such catalysts in a metallic state are platinum, ruthenium, rhodium, palladium and iridium. Especially useful are compounds or complexes of platinum such as $H_2PtCl_6$ and platinum divinyltetramethyldisiloxane complex. Such catalysts are preferably used in amounts of from 0.5 to 500 ppm (parts per million, by weight) calculated as the metallic element and based on the weight of reactants. The hydride-addition reaction is carded out a temperature of, for example, from 15° C. to 100° C., preferably 15° C. to 60° C. It is usually desirable to maintain the mixture at the desired temperature range for a period of from 1 to 48 hours. The polymeric epoxides are isolated by drying to remove the solvent. More than one equivalent amount of the unsaturated epoxy compound may be added to the solution, and the excess epoxy compound is removed by stripping under vacuum or by pouring the final mixture into a non-solvent medium for the addition product such as methanol. It is, however, desirable to use a stoichiometric amount of unsaturated epoxy compound, so that no stripping or precipitation processes are required to recover the final products.

In the epoxy-substituted polysiloxanes useful for carrying out the invention:

Lower alkyl groups which $R^1$–$R^9$ represent include methyl, ethyl, propyl, isopropyl, butyl, sec.butyl, pentyl and hexyl, preferably methyl.

$C_{2-8}$ alkylene groups which $R^{10}$ represents include ethylene, propylene, butylene, pentylene, hexylene, heptylene and octylene, preferably propylene and butylene.

Radicals which

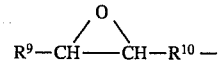

represents include 3-(glycidyloxy)propyl, 3-(glycidyloxy)-3-oxopropyl, 3-(glycidyloxy)-3-oxo-2-methylpropyl, 7,8-epoxyoctyl, 3,4-epoxybutyl and 5,6-epoxyhexyl.

Preferred epoxy-substituted polysiloxanes are those in which $R^1$, $R^2$ and $R^3$ are independently methyl or 3-(glycidyloxy)propyl groups; more preferred are those in which $R^1$, $R^2$ and $R4$–$R^8$ are methyl, $R^3$ is 3-(glycidyloxy)propyl and the ratio of m to n is about 3 to 7.

The epoxy-substituted polysiloxane polymers described above are soluble in polar organic solvents, for example, chlorinated solvents such as methylene chloride, and tetrahydrofuran. They are therefore suitable for solution coating processes, especially when mixed with a crosslinking agent and subjected to curing conditions on a coated article. These epoxy-substituted polysfloxanes contain reactive sites suitable for condensation with crosslinking agents.

All conventional epoxy curing agents, including polyamines, such as phenylenediamines, oxydianilines, methylenedianilines, diethylenetriamine, triethylenetetramine, 1-(2-aminoethyl)piperazine, diaminodiphenyl sulfone, bis(aminocyclohexyl)methane and the like; anhydrides, such as hexahydrophthalic anhydride, methyl-5-norbornene-2,3-diacid anhydride, and the like; latent curing agents, such as dicyandiamide, dihydrazides, polysulfides, and polymercaptans; can be used to cure these epoxy-functionalized organopolysiloxanes provided sufficient epoxy groups are present for adequate crosslinking. For anhydride-cured systems a non-volatile amine catalyst, such as benzyldimethylamine, is often included in the coating formulation to accelerate the rate of cure at elevated temperatures.

Preferred curing agents are the diamines derived from aromatic or cyclic compounds, and the anhydrides based on alicyclic or aromatic diacids. More preferred are methylenedianilines, hexahydrophthalic anhydride and methyl-5-norbornene- 2,3-diacid anhydride.

In accordance with the present invention, the coated article can be a fusing member in the form of a roll, belt or any surface having a suitable configuration for fixing or fusing a thermoplastic toner image to a substrate such as a paper sheet.

When the fusing member is in the form of a belt which passes around a heated resilient or hard roller the belt comprises a substrate having a thin, hard outer coating. The backup pressure roller has an overcoat which is sufficiently compliant that, in combination with the coated belt, a compliant surface is presented to an image carrying receiver sheet.

A coated fusing belt of the invention comprises a continuous flexible substrate having a surface covering of a cured epoxy-polysiloxane of the invention. The coated fusing belt is fabricated by first preparing a solution to be used to form the coating. The solution comprises a solvent, for example tetrahydrofuran, the epoxy-polysiloxane of choice, a curing agent and, if needed, a catalyst useful for crosslinking of the epoxide groups with the curing agent's reactive groups. The solution contains, for example, 5–100 parts of a curing agent, preferably 10 to 50 parts, based on 100 parts of epoxy-polysiloxane, at a concentration of from about 10 to 50 weight percent of the combined reactants. The coating solution is applied to the belt substrate by well known techniques such as blade application, ring, web or dip coating to give a 2–20 micrometer thick layer. Heat-curing is carried out at temperatures ranging from 50° to 300° C., preferably from 100° to 210° C., over a period of 30 minutes to 10 hours, most frequently from 1 to 4 hours, in well ventilated ovens, in air or under a fine stream of nitrogen.

In another embodiment of the invention the coating composition further comprises a hydroxyl functional hard silicone copolymer resin comprising difunctional and trifunctional siloxane repeating units of the formulae, $(R^{11})_2SiO$ and $R^{12}SiO_{1.5}$, respectively, wherein, $R^{11}$ and $R^{12}$ are independently methyl or phenyl, provided that the ratio of methyl to phenyl group is between 0.2 and 2 to 1. The term "hard silicone copolymer resin" will be used interchangeably with "solid silicone copolymer resin" herein, and indicates that the silicone copolymer resin is a solid at room temperature prior to curing when not in a solvent solution. The term "copolymer" used herein refers to the product of polymerization of two or more substances at the same time, for example, a terpolymer which contain three distinct monomers.

Such hard silicone resins, when blended with coating compositions, provide good stability against flow or sag on drying, and impart thermal stability and hardness to the cured coat. The hard silicone resin self-cures on heating. The level of hardness of the silicone resin varies with the degree of functionality of the siloxane units and with the ratio of methyl to phenyl groups. Preferably the ratio of difunctional to trifunctional siloxane units is between about 0.1 and 1 to 1 and, preferably the ratio of methyl to phenyl groups is between about 0.2 and 5 to 1, more preferably between about 0.2 and 2 to 1, more preferably between about 0.5 and 1.5 to 1. Many hard silicone copolymer resins useful in this invention have a silanol content of about 2 to 10 percent by weight, preferably a silanol content of about 5 to 7 percent by weight. Many hard silicone copolymer resins useful in this invention have a number-average molecular weight greater than 2,000.

Hard silicone resins are either commercially available or can be prepared by methods well known in the prior art. Suitable commercially available silicone resins are sold, for example, by Dow Corning Corp. and include those sold as solvent solutions, for example DC-804, DC-806A and DC-840, and as solids, for example DC-Z-6018 and DC-6-2230. A particularly useful resin is DC-6-2230, a dimethyldiphenylsiloxane copolymer containing methyl to phenyl groups in a ratio of about 1 to 1, difunctional to trifunctional siloxane units in a ratio of about 0.1 to 1 and having a number-average molecular weight (Mn) between 2,000 and 4,000. These silicone resins are advantageous in obtaining non-dripping coatings before final heat cure when 5 to 200 parts, preferably from 10 to 100 parts, based on 100 parts of the epoxy-substituted organopolysiloxane, are added to the coating compositions. Preferably, the resulting coating composition contains from 5 to 50 weight percent of the hard silicone resin.

The cured, thermoset resins of the invention provide hard, tough, low surface energy coatings for such fusing members and have the advantages of excellent thermal stability, good releasing properties, resistance to cleaning solvents and swelling by release oils, and resistance to abrasion and delamination. Fusing members of the invention thus have a thin, hardened surface which resists wear and cracking and resists the tendency of toner to become embedded on the surface. Their superior resistance to cleaning solvents and to swelling by release oils results in a reduction or elimination of step patterns in electrophotographic copies.

The epoxy-substituted polysiloxane described above and the coating compositions of the invention having the properties described above can also be advantageously used as low surface energy addenda for toners and toner carrier particles.

Cured coatings of the invention, on stainless steel shims or copper foils at dry thickness of about 0.5 to 50 micrometers, have exhibited good adhesion to the substrates with excellent resistance against common organic solvents, such as acetone and toluene. In addition, when evaluated as image-fixing media, the coatings have shown desirable release properties with minimal or no offsettings under simulated fusing conditions, as indicated in examples hereinafter.

EXAMPLES

The following examples illustrate the preparation, formulation, coating, curing, and subsequent testing of epoxy-substituted organopolysiloxane compositions.

Preparation of Epoxy-Substituted Organopolysiloxanes

Example 1

Toluene (10 g), PS-542 (17.5 g); a hydride-terminated polydimethylsiloxane of Mn 17,500, sold by Hülls America Inc.) and allyl glycidyl ether (2.28 g) were mixed and stirred at ambient temperature until a clear solution formed. A platinum catalyst (0.2 g; prepared by diluting 3 parts of PC-075, a platinum divinyltetramethyldisiloxane sold by Hüls America Inc., with 7 parts of toluene) was then added, and the reaction was allowed to proceed at ambient temperature overnight. The toluene and excess allyl glycidyl ether were distilled off under vacuum at 95° C., to yield the bis[3(2,3-epoxypyloxy)propyl]-terminated polydimethylsiloxane (19 g).

Example 2

By following essentially the same procedure as described for Example 1 and substituting PS-542 with PS-124.5 (a copolymer of methylhydro/dimethyl polysiloxane containing about 4 mole percent methylhydro units, of Mn 13,300, sold by Hüls America Inc.) an internally epoxy-substituted polydimethylsiloxane was obtained. Thus PS-124.5 (22 g), allyl glycidyl ether (6.84 g); toluene (10 g) and PC-075 (0.2 g) were stirred at ambient temperature for 24 hours and afforded the desired epoxy compound (23.3 g).

Example 3

By following essentially the same procedures as described for Example 1 and substituting PS-542 with PS-123 (a copolymer of methylhydro/dimethyl polysiloxane containing about 30 mole percent methylhydro units, of Mn 2,000, sold by Hüls America Inc.) an internally epoxy-substituted polydimethylsiloxane was obtained. Thus, PS-123 (100 g), allyl glycidyl ether, toluene (50 g) and PC-075 (0.45 g) were mixed and stirred at room temperature until all allyl and silane groups were consumed (monitored by NMR and IR spectra). The product was dried to give a quantitative yield of epoxy-substituted product.

Example 4

By following essentially the same procedure as described for Example 1 and substituting PS-542 with PS-537 (a hydride-terminated polydimethylsiloxane of Mn 400, sold by Hüls America Inc., an epoxy-terminated polydimethylsiloxane was obtained. Thus PS-537 (100 g), allyl glycidyl ether (114 g) and PC-075 (0.45 g) were mixed at ambient temperature. The reaction mixture was stirred for 24 hours and excess allyl glycidyl ether was removed under vacuum at 140° C. to yield the epoxy-substituted product.

Example 5

By following essentially the same procedure as described for Example 1 and substituting PS-542 with PS-129.5 (a methylhydro/methylphenyl polysiloxane containing about 45 mole percent methylhydro units, of Mn 1,000, sold by Hüls America Inc.) an internally epoxy-substituted polysiloxane was obtained. Thus PS-129.5 (20 g), allyl glycidyl ether (11.4 g) and PC-075 (0.01 g) were mixed and stirred at ambient temperature for 4 hours to produce the desired epoxy-substituted polymethylphenylsiloxane.

Coating, Curing and Testing of Epoxy-Substituted Organopolysiloxanes

Example 6

The epoxy-substituted organopolysiloxanes, as described in Examples 3 and 4, were dissolved in a minimum amount of tetrahydrofuran in the presence of a curing agent and catalyst, with and without additional hard silicone resins, according to Table I, and coated on copper foils and stainless steel shims.

TABLE I

| Sample ID | Example (Wt, g) | Curing Agent (Wt, g) | Catalyst (Wt, g) | Solvent (Wt, g) | Silicone Resin (Wt, g) | Curing Condition T° C. | Hours |
|---|---|---|---|---|---|---|---|
| S-1 | 3 (17.04 g) | HHPA (5.03 g) | DMBA (0.29 g) | THF (160 g) | DC6-2230 (17.04 g) | 100 / 150 | 2 / 4 |
| S-2 | 3 (34.08 g) | HHPA (11.26 g) | DMBA (0.58 g) | THF (80 g) | DC6-2230 (34.08 g) | 100 / 150 | 2 / 4 |
| S-3 | 3 (2 g) | HHPA (1.39 g) | DMBA (0.02 g) | THF (4 g) | — | 100 / 150 | 2 / 4 |
| S-4 | 3 (2 g) | MDA (0.50 g) | — | THF (4 g) | — | 160 | 4 |
| S-5 | 3 (2 g) | NDA (0.89 g) | DMBA (0.03 g) | THF (4 g) | — | 100 / 150 | 2 / 4 |
| S-6 | 4 (2.98 g) | MDA (0.50 g) | — | THF (4 g) | — | 160 | 4 |
| S-7 | 4 (2.98 g) | BACHM (0.53 g) | — | THF (4 g) | — | 160 | 4 |
| S-8 | 3 (2 g) | HHPA (1.39 g) | DMBA (0.02 g) | THF (4 g) | — | 100 / 150 | 2 / 4 |
| S-9 | 3 (2 g) | MDA (0.50 g) | — | THF (4 g) | — | 160 | 4 |
| S-10 | 3 (2 g) | BACHM (0.89 g) | — | THF (4 g) | — | 160 | 4 |
| S-11 | 4 (2.98 g) | MDA (0.50 g) | — | THF (4 g) | SR-141 (1.49 g) | 160 | 4 |
| S-12 | 4 (2.98 g) | BACHM (0.53 g) | — | THF (4 g) | DC-6-2230 (2.98 g) | 160 | 4 |
| S-13 | 3 (2.05 g) | MDA (0.50 g) | — | THF (4 g) | DC-6-2230 (2.05 g) | 160 | 4 |
| S-14 | 3 (2.33 g) | HHPA (0.77 g) | DMBA (0.04 g) | THF (4 g) | DC-6-2230 (2.33 g) | 100 / 150 | 2 / 4 |
| S-15 | 3 (2.33 g) | NDA (0.89 g) | DMBA (0.04 g) | THF (4 g) | DC-6-2230 (2.33 g) | 100 / 150 | 2 / 4 |
| S-16 | 4 (2.98 g) | MDA (0.50 g) | — | THF (4 g) | DC-6-2230 (2.98 g) | 160 | 4 |

HHPA is Hexahydrophthalic anhydride

TABLE I-continued

| Sample ID | Example (Wt, g) | Curing Agent (Wt, g) | Catalyst (Wt, g) | Solvent (Wt, g) | Silicone Resin (Wt, g) | Curing Condition T° C. | Hours |
|---|---|---|---|---|---|---|---|

DMBA is Dimethylbenzylamine
MDA is Methylenedianiline
NDA is Methyl-5-norbornene-2,3-diacid anhydride
BACHM is Bis(aminocyclohexyl)methane
THF is Tetrahydrofuran
DC6-2230 is a silicone resin from Dow Corning Corp.
SR-141 is a silicone resin from General Electric Co.

A coated test strip was mounted on a test roller to evaluate the release properties under simulated fusing conditions. A branched polyester color image on laser print paper released from all of the coatings with minimal or no offset, while an uncoated stainless strip failed to release, under the following fusing conditions:

Fusing Temperature: 265° F. (approx. 130° C.)
Release Temperature: 120° F. (approx. 49° C.)
Speed: one inch (approx. 2.54 cm) per sec.
Pressure: 0.5 psig (approx. 351 Kg/m²)
Nip Width: 100 mils (approx. 2.5 mm)
Pressure Roller: 20 mil (approx. 500 micrometer) Fluorinated Ethylenepropylene (FEP supplied by Dupont) over 20 mil (approx. 500 micrometer) Silicone Elastomer (Silastic J supplied by Dow Corning Corp.). The best release properties and cured coatings were those made with the hard silicone copolymer resin in the composition.

Test of Coating Life On A Fusing Belt

Toner fusing belts were coated with Sample (S-1) at a 2 micrometer and a 15 micrometer thickness and tested under simulated copying conditions as follows:

Fusing Temperature: 260° F. (approx. 126° C.)
Release Temperature: 115° F. (approx. 46° C.)
Nip Width: 200 mils (5 mm approx.)
Nip Time: 130 msec.
Speed: 2.5 inches per sec. (approx. 6.4 cm/sec.)
Pressure Roll: 0.001" (approx. 25 micrometer) of Silastic E over 0.150" (approx. 3.8 mm) of Silastic J. [Silastic E and J are silicone elastomers supplied by Dow Corning Corp.]
Toner: Cyan branched amorphous polyester
Paper: Bond The 2 micrometer thick coating had a lifetime of 3433 copies.
The 15 micrometer thick coating had a lifetime of 3350 copies.

Although the invention has been described in detail with particular reference to certain preferred embodiments thereof, it should be appreciated that variations and modifications can be effected within the spirit and scope of the invention.

What is claimed is:

1. A coated article comprising:
   a substrate, and coated thereon a composition comprising a crosslinked product of;
   an epoxy-substituted organopolysiloxane,
   a solid silicone copolymer resin and
   a crosslinking agent for crosslinking with the epoxy-substituted organopolysiloxane;
   wherein,
   said epoxy-substituted organopolysiloxane has the formula,

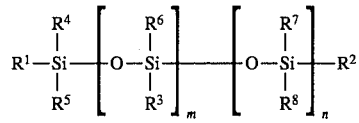

wherein,
$R^1$, $R^2$ and $R^3$ are independently $C_{1-6}$ alkyl, phenyl or a monovalent epoxy-containing hydrocarbon group of the formula,

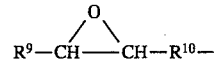

provided that said epoxy-substituted organopolysiloxane has at least two monovalent epoxy-containing hydrocarbon groups;
$R^4$–$R^8$ are independently $C_{1-6}$ alkyl or phenyl;
$R^9$ is H or $C_{1-6}$ alkyl;
$R^{10}$ is $C_{2-8}$ alkylene, optionally interrupted by —O— or

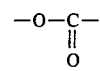

groups;
m is 0 to 1,000; and
n is 5 to 10,000;
wherein said solid silicone copolymer resin comprises difunctional and trifunctional siloxane units and the ratio of difunctional to trifunctional siloxane units is between about 0.1 and 1 to 1.

2. A coated article according to claim 1, wherein said solid silicone copolymer resin comprising repeating units of the formulae,

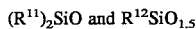

wherein,
$R^{11}$ and $R^{12}$ are independently methyl or phenyl, provided that the ratio of difunctional to trifunctional siloxane units is between about 0.1 and 1 to 1.

3. A coated article according to claim 1, wherein $R^1$ to $R^3$ are independently methyl or 3-(glycidyloxy)propyl.

4. A coated article according to claim 1, wherein $R^4$ to $R^8$ are methyl.

5. A coated article according to claim 1, wherein said crosslinking agent is a polyamine or a polyanhydride.

6. A coated article according to claim 5, wherein said polyamine is a methylenedianiline.

7. A coated article according to claim 5, wherein said polyanhydride is hexahydrophthalic anhydride or methyl norbornene diacid anhydride.

8. A coated article according to claim 1, wherein said substrate is a belt comprising a continuous flexible substrate.

9. A coated article according to claim 1, wherein said composition contains from about 5 to 50 weight percent of said crosslinking agent.

10. A coated article according to claim 1, wherein said composition contains from about 5 to 50 weight percent of said solid silicone copolymer resin.

11. A method of fusing heat-softenable toner to a substrate comprising:

forming an image pattern of toner particles on a receiver sheet by electrostatic attraction; and contacting the receiver sheet with the belt of claim 8 at a temperature and pressure sufficient to fuse the toner particles to the receiver.

12. A coated article according to claim 1, wherein said solid silicone copolymer resin possesses a silanol content of about 2 to 10 percent by weight.

13. A coated article according to claim 1, wherein said solid silicone copolymer resin comprises methyl and phenyl groups and the ratio of methyl to phenyl groups is between about 0.2 and 5 to 1.

14. A coated article comprising:

a substrate, and coated thereon a composition comprising a crosslinked product of;

an epoxy-substituted organopolysiloxane, a solid silicone copolymer resin and a curing agent for crosslinking with the epoxy-substituted organopolysiloxane;

wherein, said epoxy-substituted organopolysiloxane has the formula,

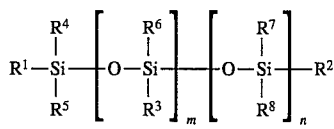

wherein, $R^1$, $R^2$ and $R^3$ are independently $C_{1-6}$ alkyl, phenyl or a monovalent epoxy-containing hydrocarbon group of the formula,

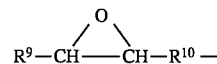

provided that said epoxy-substituted organopolysiloxane has at least two monovalent epoxy-containing hydrocarbon groups;

$R^4$–$R^8$ are independently $C_{1-6}$ alkyl or phenyl;

$R^9$ is H or $C_{1-6}$ alkyl;

$R^{10}$ is $C_{2-8}$ alkylene, optionally interrupted by —O— or

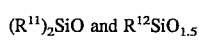

groups;

m is 0 to 1,000; and n is 5 to 10,000;

wherein said solid silicone copolymer resin has repeating units of the formulae,

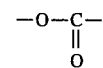

wherein, $R^{11}$ and $R^{12}$ are independently methyl or phenyl, provided that the ratio of methyl to phenyl groups is between about 0.2 and 5 to 1, and wherein said solid silicone copolymer resin has a ratio of difunctional to trifunctional siloxane units between about 0.1 and 1 to 1.

15. A coated article according to claim 14, wherein said solid silicone copolymer resin has a number-average molecular weight greater than 2,000.

16. A coated article according to claim 14, wherein said solid silicone copolymer resin has a silanol content by weight of between about 2 to 10 percent by weight.

17. A coated article according to claim 14, wherein said solid silicone copolymer resin has a number-average molecular weight between 2,000 and 4,000, a silanol content of about 5 to 7 percent by weight and wherein said coated article is a fuser member.

18. A coated article according to claim 17, wherein said composition contains from about 5 to 50 weight percent of said curing agent.

19. A coated article according to claim 17, wherein said composition contains from about 5 to 50 weight percent of said solid silicone copolymer resin.

* * * * *